US007788357B2

(12) United States Patent
Riley et al.

(10) Patent No.: US 7,788,357 B2
(45) Date of Patent: Aug. 31, 2010

(54) POLICY-BASED ADMISSION CONTROL AND BANDWIDTH RESERVATION FOR FUTURE SESSIONS

(75) Inventors: Yusun Kim Riley, Marlborough, MA (US); Manas Tandon, Woburn, MA (US); Pramod Kalyanasundaram, Acton, MA (US)

(73) Assignee: Camiant, Inc., Marlborough, MA (US)

( * ) Notice: Subject to any disclaimer, the term of this patent is extended or adjusted under 35 U.S.C. 154(b) by 910 days.

(21) Appl. No.: 11/041,918

(22) Filed: Jan. 24, 2005

(65) Prior Publication Data

US 2005/0228892 A1 Oct. 13, 2005

Related U.S. Application Data

(60) Provisional application No. 60/538,801, filed on Jan. 23, 2004, provisional application No. 60/538,802, filed on Jan. 23, 2004.

(51) Int. Cl.
*G06F 15/173* (2006.01)

(52) U.S. Cl. ........................ 709/223; 709/203; 709/217; 709/219; 709/224; 709/225; 709/227; 709/228; 709/229; 370/229

(58) Field of Classification Search .................. 709/203, 709/217, 219, 223–225, 227–229; 370/229
See application file for complete search history.

(56) References Cited

U.S. PATENT DOCUMENTS

| 6,385,454 | B1 * | 5/2002 | Bahl et al. ................. 455/450 |
| 6,738,390 | B1 | 5/2004 | Xu et al. |
| 6,771,595 | B1 * | 8/2004 | Gilbert et al. ................ 370/229 |
| 6,771,639 | B1 | 8/2004 | Holden |
| 6,898,641 | B1 * | 5/2005 | Kobayashi .................. 709/238 |
| 6,947,378 | B2 * | 9/2005 | Wu et al. ..................... 370/229 |
| 7,027,391 | B2 * | 4/2006 | Sahinoglu et al. ........... 370/229 |
| 7,139,813 | B1 * | 11/2006 | Wallenius .................... 709/219 |
| 2002/0032794 | A1 * | 3/2002 | Nishida et al. .............. 709/233 |
| 2002/0150044 | A1 * | 10/2002 | Wu et al. ..................... 370/229 |
| 2003/0044762 | A1 | 3/2003 | Brusca |

(Continued)

FOREIGN PATENT DOCUMENTS

WO WO-03/042856 5/2003

(Continued)

OTHER PUBLICATIONS

U.S. Appl. No. 10/867,157, filed Jun. 14, 2004, Riley et al.

(Continued)

*Primary Examiner*—Liangche A. Wang
(74) *Attorney, Agent, or Firm*—Jenkins, Wilson, Taylor & Hunt, P.A.

(57) ABSTRACT

A method for delivering content over a network, the method involving: receiving a request to establish a session at a future time T1 over the network, the requested session for transferring content between a content server and a subscriber's equipment; reserving network capacity necessary to support the requested future session; acknowledging to the requestor that network resources have been reserved for said requestor for time T1; and when current time reaches time T1, causing the requested session to be set up for transferring content between the content server and the subscriber's equipment.

16 Claims, 3 Drawing Sheets

U.S. PATENT DOCUMENTS

| | | | |
|---|---|---|---|
| 2003/0229692 | A1 | 12/2003 | Vo |
| 2004/0044762 | A1 | 3/2004 | Peacock |
| 2004/0083267 | A1 | 4/2004 | Thompson |
| 2004/0125779 | A1* | 7/2004 | Kelton et al. ............... 370/338 |
| 2004/0225687 | A1 | 11/2004 | Larsson et al. |
| 2005/0076336 | A1* | 4/2005 | Cutrell et al. ............... 718/100 |
| 2006/0038877 | A1 | 2/2006 | Richardson et al. |

FOREIGN PATENT DOCUMENTS

| | | |
|---|---|---|
| WO | WO-03/052993 | 6/2003 |

OTHER PUBLICATIONS

U.S. Appl. No. 10/867,158, filed Jun. 14, 2004, Riley et al.
U.S. Appl. No. 10/867,159, filed Jun. 14, 2004, Riley et al.
U.S. Appl. No. 11/041,779, filed Jan. 24, 2005, Riley.
"Cable Modem Termination System—Network Side Interface Specification," SP-CMTS-NSII01-960702, I01, Jul. 2, 1996.
Data Over Cable System Interface Specification Quality of Service Management Information Base (DOCSIS-QOS MIB), Feb. 2005.
"PacketCable 1.2 Architecture Framework Technical Report," PKT-TR-ARCH1.2-V01-001229, V01, Dec. 29, 2000.
"PacketCable Dynamic Quality-of-Service-Specification," PKT-SP-DQOS-I09-040402, I09, Apr. 2, 2004.
"PacketCable Multimedia Architecture Framework Technical Report," PKT-TR-MM-ARCH-V01-030627, V01, Jun. 27, 2003.
"PacketCable Multimedia Specifcation," PKT-SP-MM-I01-030627, I01, Jun. 27, 2003.
"SDP: Session Description Protocol," RFC 2327, Apr. 1998.
"SIP: Session Initiation Protocol," RFC 3261, Jun. 2002.
"Specification of Guaranteed Quality of Service," RFC 2212, Sep. 1997.
"Specification of the Controlled-Load Network Element Service," RFC 2212, Sep. 1997.
"The Use of RSVP with IETF Integrated Services," RFC 2210, Sep. 1991.
European Search Report issued for European Application No. EP05706073, dated Sep. 29, 2008.

* cited by examiner

POLICY-BASED ADMISSION CONTROL AND BANDWIDTH RESERVATION FOR FUTURE SESSIONS

This application claims the benefit of U.S. Provisional Application No. 60/538,801, filed Jan. 23, 2004 and U.S. Provisional Application No. 60/538,802, filed Jan. 23, 2004, both of which are incorporated herein by reference.

TECHNICAL FIELD

This present invention relates generally to the field of communications and networking, and particularly to delivery of services over broadband infrastructures.

BACKGROUND OF THE INVENTION

The network-resources needed to deliver a service are constrained by the interconnecting technologies that make up the network. Due to business reasons, the capacity of the service provider's network cannot grow linearly with the addition of new end users. As a result, the service provider must perform what is referred to as oversubscription. This means the same resources in the network are sold multiple times to different end users.

Oversubscription is based on the principle that not all users will be consuming their data pipe simultaneously. The service provider estimates how much simultaneous usage there will be of the network and provides some maximum limits to the amount of resources used by each data pipe. During times of congestion (i.e., many end users trying to access the network at the same time with traffic levels exceeding what the network can handle) the quality of service associated with the sessions may degrade substantially if the network cannot differentiate between those sessions that require special treatment and others that do not require such special treatment. This results in the resources consumed by a service (or an aggregate of services) being limited by the characteristics of the data pipe to the end user.

For example, in a video-on-demand application (e.g., where a user requests a video clip or movie) if an end user wishes to download streaming video from a content provider (i.e., a dynamic service) via today's static data pipe the viewing experience would likely be much poorer than the viewing experience one would get by watching traditional broadcast TV. The reason for this is that there is a certain amount of bandwidth that is needed for the video frames to be delivered which if not made available by the network, results in poor viewing quality (e.g. jerky, frame loss, etc.) for the user. This is true if the service provider access network is based on best effort delivery of content, which can be inadequate compared to the quality of service needed for such service delivery. This is especially true in a shared contention based access network where multiple users contend for the same set of network resources.

Today, the model often used for offering differentiated services to the end user is Tiered Services (e.g., bronze, silver, gold). Service providers offer a tiered service model in which the characteristics of the data pipe may differ based on the tier that the end user or subscriber has subscribed to.

One approach that has been proposed for delivering services that are more responsive to changing network conditions and that is designed to permit distinguishing among the levels of quality of service provided to various subscribers and providers is described in U.S. Ser. No. 10/867,157, filed Jun. 14, 2004, entitled "Dynamic Service Delivery Platform for Communication Networks," incorporated herein by reference. According to that approach, the policy server stores rules or policies regarding the level of service that various subscribers are entitled to receive from various providers and then to allocate resources in accordance with those policies.

It discloses a method of managing dynamic services that are provided over a network. The method involves: storing rules for controlling admission to the network; keeping track of state of the network; receiving a request for establishing a session over the network; and using both the stored rules and the state of the network to determine whether to grant the request for establishing the session.

SUMMARY OF THE INVENTION

In general, in one aspect he invention features a method for delivering content over a network. The method involves: receiving a request to establish a session at a future time T1 over the network, the requested session for transferring content between a content server and a subscriber's equipment; reserving network capacity necessary to support the requested future session; acknowledging to the requestor that network resources have been reserved for said requestor for time T1; and when current time reaches time T1, causing the requested session to be set up for transferring content between the content server and the subscriber's equipment.

Other embodiments include one or more of her following features. Reserving network capacity further includes determining whether sufficient network capacity will be available at time T1 to support the requested session and reserving network capacity is contingent upon determining that sufficient network capacity does exist. The method also includes keeping track of network capacity that is being set aside for other future sessions and predicting what resources will be requested at time T1 in the future. Determining whether sufficient network capacity will be available at time T1 takes into account the predicted requests. The method also includes: maintaining a plurality of queues each of which corresponds to a different priority level; and determining a priority level for the session that was requested, the priority level for the session being the same as the priority level for one of the plurality of queues. Also, reserving the network capacity involves storing a reservation in a queue corresponding to the priority level of the requested session. The method of claim 5, further comprising polling the plurality of queues in order of their priority levels to identify any stored requests having a reservation time that equals current time and for any stored requests having a reservation time that equals current time, setting up a corresponding requested session on the network for delivering content. The network over which the content is delivered includes at least a portion that is a cable network. Receiving a request to establish a session at a future time T1 over the network involves receiving the request via a PCMM protocol. The content server is a multimedia server.

In general, in another aspect, the invention features another method of managing delivery of content over a network. The method involves: maintaining a plurality of queues, each one associated with a different priority level and each one for storing reservations for future sessions that have associated priorities equal to the priority level of that queue; and periodically polling the plurality of queues in order of their priority level to identify all requests which are ready to be acted upon.

Other embodiments include one or more of the following features. Polling involves going through all requests stored in one of the plurality of queues before moving on to another queue.

In general, in another aspect, the invention features still another method for delivering content over a network. This method involves: receiving a request to establish a session over a network between a content server and subscriber equipment, the session being for transferring content between the content server and the subscriber's equipment; determining that sufficient network capacity is not presently available to support the requested session; predicting what network capacity will be available after a later time T1; and if sufficient network capacity is predicted to be available shortly, refraining from rejecting the request.

Other embodiments include one or more of the following features. The method also involves waiting until current time reaches T1 and then accepting the request to set up a session between the content server and the subscriber's equipment. Or when the current time reaches T1, setting up the requested session. The method also includes notifying the requestor that sufficient network capacity will become available at the later time T1 and offering the requestor an opportunity to cancel the request or permit a delay of at least until time T1 before a response to the request is required.

In general, in another aspect the invention features a policy server for managing delivery of content over a network. The policy server includes: a processor; and memory storing program code which when executed on the processor enables the policy server to: receive a request to establish a session at a future time T1 over the network, the requested session for transferring content between a content server and a subscriber's equipment; reserve network capacity necessary to support the requested future session; acknowledge to the requestor that network resources have been reserved for the requestor for time T1; and when current time reaches time T1, cause the requested session to be set up for transferring content between the content server and the subscriber's equipment.

In general, in yet another aspect the invention features a policy server for managing delivery of content over a network. The policy server includes: a processor; and memory storing program code which when executed on the processor enables the policy server to: maintain a plurality of queues in memory, each one associated with a different priority level and each one for storing reservations for future sessions that have associated priorities equal to the priority level of that queue; and periodically poll the plurality of queues in order of their priority level to identify all requests which are ready to be acted upon.

In general, in still yet another aspect the invention features a policy server for managing delivery of content over a network. The policy server includes: a processor; and memory storing program code which when executed on the processor enables the policy server to: receive a request to establish a session over a network between a content server and subscriber equipment, the session for transferring content between the content server and the subscriber's equipment; determine that sufficient network capacity is not presently available to support the requested session; predict what network capacity will be available after a later time T1; and if sufficient network capacity is predicted to be available shortly, refraining from rejecting the request.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
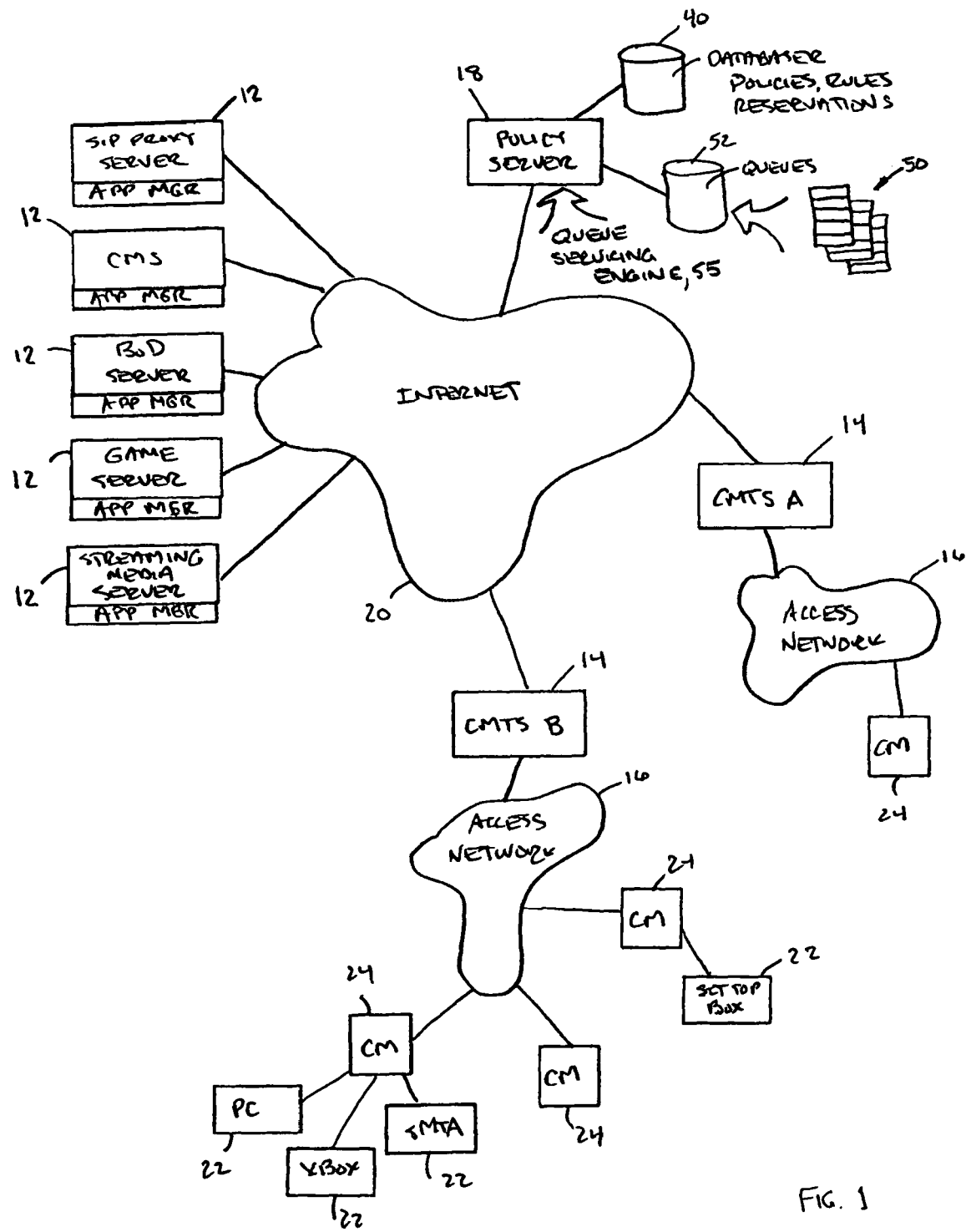
FIG. 1 is a block diagram of the architecture of a cable network for delivering multimedia content to subscribers.

FIG. 1 is a high level diagram of a the architecture for delivering multimedia sessions over a DOCSIS-based HFC network with Quality of Service. It includes an application servers (AS) 12; multiple Cable Modem Termination Systems (CMTSs) 14, which function as gateways to one or more access networks 16; and a policy server (PS) 18, which manages admission control and Quality of Service on behalf of application server 12. These elements are typically connected to a network 20 (e.g. the Internet) over which they are able to communicate with each other. Customer Premises Equipment (CPE) 22, such as personal computers (PCs), game consoles, or set top boxes (STBs), are connected to the access networks 16 through Cable Modems (CM) 24.

In general, application server 12 requests application sessions with identified subscribers. These requests go to policy server 18, which evaluates them and either approves or denies them, depending on availability of network resources and policies or rules that are available to the policy server. If the request is approved, policy server 18 instructs the appropriate CMTS 14 behind which the cable modem for that subscriber is located to reserve bandwidth for the duration of the session. When the session is terminated or ends, the application informs policy server 18 and the policy server tears down the flows at the CMTS. In the described embodiment, policy server 18 also receives requests for the reservation of resources in the future and grants or denies those requests depending on what the expected state of the network will be at that future time. If the reservation is granted, when the time comes, the policy server cause the CMTS to establish the requested session connecting the identified server with the IP address at which the subscriber is located.

Before providing additional the details the particular aspects of the network that relate to reserving future resources, the various network components that participate in that process will first be described in greater detail.

The CMTS, which is a device that sits at a cable head-end, functions as a data switching system designed to route data to and from many cable modem users over a multiplexed network interface. It integrates upstream and downstream communications over the access networks (e.g. a cable data network) to which it is connected. The CMTS implements a protocol (e.g. the DOCSIS RFI MAC protocol) to connect to cable modems over the access network. DOCSIS refers to the set of Data-Over-Cable Service Interface Specifications, which defines how to transmit data over cable networks in a standard fashion (see DOCSIS 1.0, 1.1, and 2.0). RFI is the DOCSIS Radio Frequency Interface specification defining MAC and Physical Layer interfaces between CMTS and CM network elements.

Application server 12, which is managed by a content provider, is the entity that delivers the content to the applications on CPEs 22 connected to cable modems 24. On the Internet, common examples of such servers include the Yahoo web server; file upload servers; video servers; Xbox servers, etc.

There is also an application manager (AM) 26 which is a system that interfaces to policy server 18 for requesting QoS-based service on behalf of an end-user or network management system. Typically, application manager 26 is implemented as part of application server 12, as indicated.

Cable modems 24 enable other Customer Premises Equipment (CPE) 22 to connect to access network 16 and receive cable services. In the described embodiment, the cable modem is a 64/256 QAM (Quadrature Amplitude Modulation) RF receiver that is capable of delivering up to 30 to 40 Mbps of data in a 6 MHz cable channel. Data from the user is modulated using a QPSK/16 QAM transmitter with data rates from 320 kbps to 10 Mbps (where QPSK refers to Quadrature Phase Shift Keying modulation). The upstream and downstream data rates can be flexibly configured using cable modems to match subscriber needs.

Policy server 18 is a system that primarily acts as an intermediary between application manager 26 and CMTS(s) 14. It generally manages the operation of the CMTSs by applying network policies to requests from the application managers, and proxies messages between the application manager and CMTS. In the described embodiment, it implements the functionality that is specified by the Packet Cable Multimedia (PCMM) standards (e.g. see PacketCable Multimedia Architecture Framework Technical Report PKT-TR-ARCH-V01-030627) as well as the extended functionality described herein. In its capacity as an intermediary, policy server 18 grants QoS for different requesters based on policy rules established by the operator of the network or service, and affects the QoS by pushing down policy decisions to the termination devices (e.g. the CMTSs). Its extended functionality includes keeping track of and monitoring the state of the network (what is happening on the network, the state of the sessions, etc.) and making policy decisions based on the state of the network.

In the described embodiment, the policy server controls all resources that are available on the access network. In addition, the policy server is typically under the control of the cable operator as are the CMTSs and the access network over which the multi-media stream will be delivered to the subscriber. The application servers that generate those media streams are typically owned by and are under the control of a third party, though they may also be owned and operated by the cable operator.

In general, the described embodiment enables the delivery of dynamic services over communication networks using the techniques described in the previously mentioned patent application (i.e., U.S. Ser. No. 10/867,157). The delivery of a service involves: a user (also referred to as an end-user) of the service; a delivery network that facilitates the delivery of the service (e.g. access network 16), and a provider of the content for the service. The delivery network (or access network 16) is owned by an entity generally referred to as a service provider. A user of the service generally includes any human operator or machine that can invoke the service. A user or subscriber could be a residential, business, or any other legitimate customer of the service provider. A provider of content for the service is referred to as a content provider. The source for the content could be owned and managed by the service provider in which case the content is referred to as local content. Alternatively, the source for the content could be owned and managed by some entity other than the service provider in which case the content is referred to as 3rd party content.

Typically, the dynamic service that is being delivered is a service that a legitimate user can invoke on-demand and that is provided by one or more content providers and delivered over one or more delivery networks owned by one or more service providers. In the case of the cable network embodiment described herein, examples of dynamic services include but are not restricted to: voice and video telephony; video-on-demand; Internet data service; gaming, and time-based and/or volume-based services.

For any service to be delivered to the user of the service, a path, referred to as a data pipe is provided between the content provider and the user. Typically, the service provider is the entity that is responsible for the delivery network and the provisioning of the data pipe. The data pipe is a logical conduit that traverses one or more physical network elements and provides connectivity to deliver data between two end-points that participate in a service. The delivery of content, be it either video, voice/telephony or Internet data, is provided to the broadband user either at the home or business over such a data pipe to the home or business, where the data pipe is established through static or configured means.

Provisioning of the data pipe is the process of configuring, managing, and activating an electronic service (e.g., telephone, video) as well as automatically adapting the data pipe to satisfy a customer requesting dynamic services.

The data pipe is used to support sessions between communicating entities. A session refers to the flow of information between two (2) or more end points that is participating in the request for and delivery of the service (e.g. Video-on-demand, gaming, telephony/voice, file sharing, etc). A session thus represents a dynamic context associated with an instance of a dynamic service invocation. A session includes all data flows that are needed to provide the service and all resources used on various elements through which the data pipe traverses. For a voice call, a session would map to the connection between end users which results when a user makes a telephone call to the callee. Such a voice session includes all the network resources utilized to complete the call. For a multimedia messaging service, a session includes the video, voice and data traffic (content) along with network resources needed to provide the messaging service.

Priority-Based Future Reservations:

In order to perform admission control for a future use of resources, the resource granter has to determine, based on its understanding of forecasted or predicted network utilization state, whether or not the future reservation can succeed.

In the described embodiment, the resource granter is the policy server. The policy server controls the CMTSs and determines what types of traffic have priority over other types of traffic. In general, in the described embodiment CMTSs are not permitted to service traffic without authorization from policy server. There are basically two types of traffic, namely, quality of service (QoS) traffic and "best efforts" traffic. All QoS requests (i.e., all requests for quality of service sessions) must go through the policy server and the policy server keeps track of what resources are being used to service those requests presently and what has been committed for future use. Though the best efforts requests do not go through the policy server, the policy server determines what the maximum amount resources the CMTS is permitted to use to service such requests and, in general, it assumes that the amount available to service the best efforts requests will not be available to service quality of service requests. Because of that, the policy server is able to know what the minimum amount of resources will be available at those CMTSs at any time.

Typically, when resources are reserved, they are done on a first come first serve basis, and the resource reservation requests take affect immediately. According to the "future reservation system," the application server/manager or the client requesting the resource can ask for a future reservation to the policy server that is responsible for granting reservation requests. The request to the policy server is to reserve bandwidth for the relevant period of time. The policy server has one or more databases 40 in which it keeps track of what resources it has reserved for when and it reserves network resources for the requested scheduled future time.

There are likely to be many requesters of future reservations, and those requestors will have different levels of importance (i.e., different priorities). The policy server determines the relative importance of the various requests for reservations and reserve resources accordingly, ensuring for those more critical requests, whether the requests came from applications or end users, a higher probability of gaining access to resources.

Figure 2:
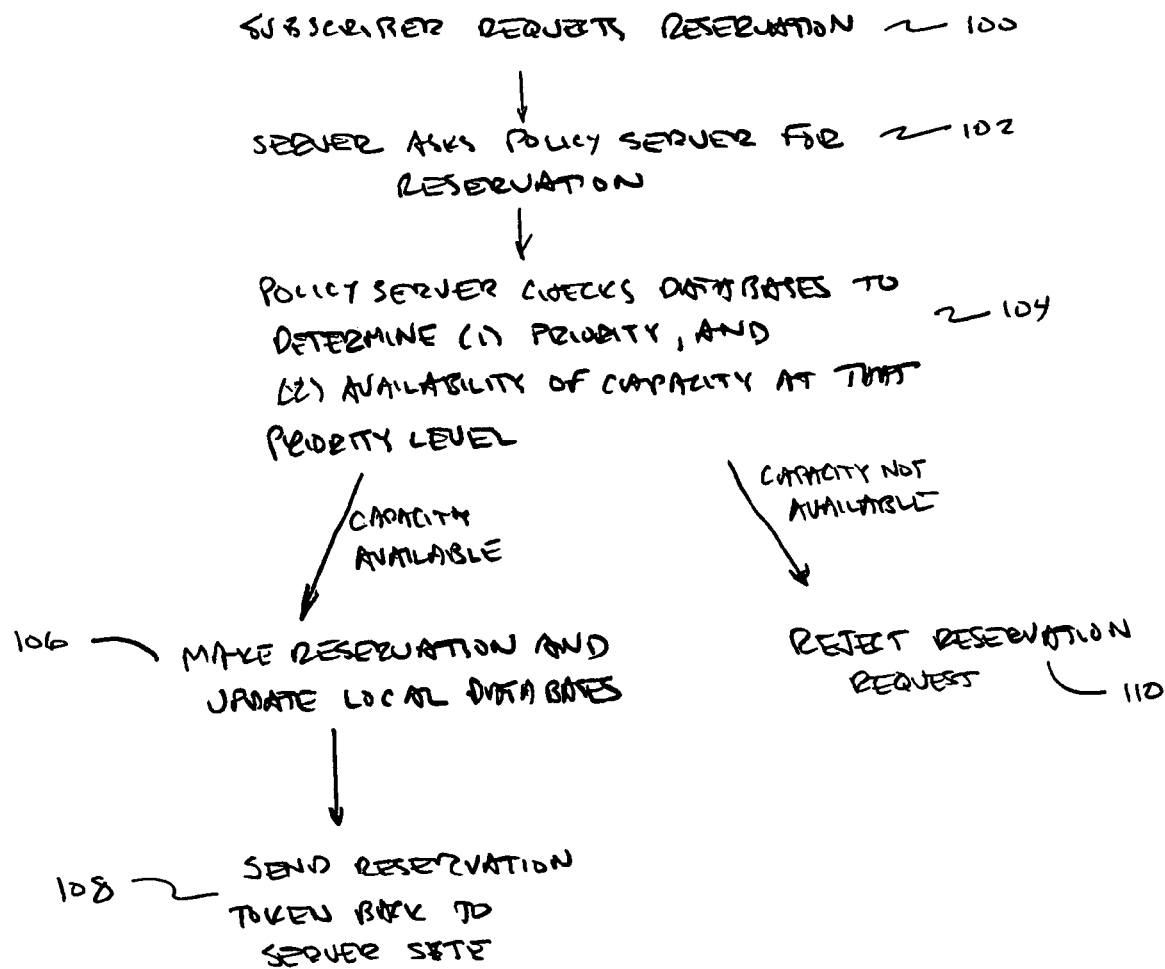
FIG. 2 is a flow chart of the reservation process.
Figure 3:
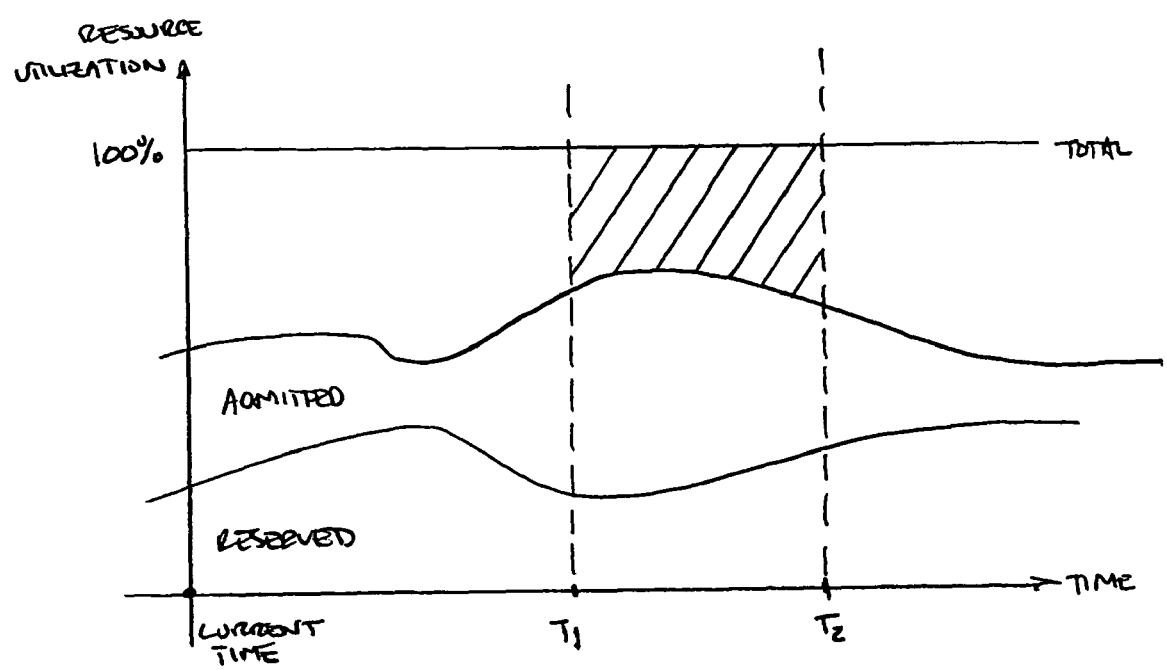
FIG. 3 is a chart the future capacity that is subject to reservations.

This process can be better understood by walking through a specific example, which is illustrated by FIG. 2. Suppose that a subscriber wants to receive streaming video from MLB.com for a game that is to be televised three weeks from today. The subscriber, possibly through a browser interface running on his PC, a set top box, or some other convenient interface, connects with the MLB.com server site to sign up for that broadcast and request a reservation for the future program broadcast (step 100). The MLB.com server, in turn, sends a corresponding request to the policy server asking for a reservation for that subscriber for the selected event in the appropriate time slot (step 102).

Upon receiving that request, the policy server interrogates its databases: (1) to determine the priority level to which the subscriber is entitled; and (2) to determine whether network resources are available for the relevant period of time (step 104).

In this example, it is assumed that the levels of service that are available are designated platinum, gold, and silver, with platinum having the highest priority and receiving the highest level of service and silver receiving the lowest. The cable operator can establish priority levels based on any criteria and is likely to do so in a manner that makes the most commercial sense. The key factors in determining the priority level that is to be given to the reservation are likely to be the identity of the subscriber and the identity of the application or media source. Thus, for example, the subscribers who are willing to pay the highest subscription fees are likely to be among those who are entitled to the platinum level. Similarly, the cable operator is likely to determine that media streams from premium sources for which subscription fees are higher and for which revenues to the cable operator are also likely to be higher, are entitled to higher priority and higher quality of service than are less expensive media content sources. In any event, the policy server includes one or more algorithms that make the priority decisions based upon potentially a wide variety of factors to arrive at a priority level and assignment structure that produces the most revenue for the cable operator.

In the present example, if it is determined that sufficient resources are available at the priority level for which the subscriber is qualified, the policy server reserves the required resources for that request by updating its database to assign those resources to the subscriber and to indicate that those resources are no longer available for other subscribers or sessions (step 106). In the described embodiment, the policy server also sends a token back to the application server acknowledging that a reservation has been made and identifying the reservation, e.g. by a serial number or some other unique identifier (step 108).

Of course, if sufficient network capacity is not available to support the reservation, then the policy server rejects the reservation request (step 110).

When the time comes to send the reserved video stream, the application server at the MLB.com site sends the token to the policy server. This approach is referred to as the interrupt model according to which the session is established the application server asks for it to be established so long as it is within the reserved time slot. The policy server upon receiving the token checks its database to determine whether the received token is a valid token, what connection needs to be established, and what the priority level is for the resulting session. Then, the policy server instructs the corresponding CMTS to set up the session over which the MLB.com server will steam the video content to the subscriber.

Determining Available Capacity:

When the policy server determines whether to grant a reservation request, it checks for expected demand for all times during which that requested session will be active. Referring to FIG. 2, in general terms, the available capacity is equal to the total capacity that the CMTS is capable of delivering (see top line) minus the expected utilization during the time slot. In this example, it is assumed that there are two types of expected future utilization, namely, 'reserved' and 'admitted.' The capacity that is 'reserved' is future capacity that is set aside for subscribers who have paid for the reservation in advance. The capacity that is 'admitted' is future capacity that is set aside for subscribers who have asked for a reservation of future capacity but who do not pay in advance (e.g. they might pay just before the session is established). The reason for making such a distinction might be that the operator may wish to treat the admitted capacity as having a lower priority which could be displaced by subscribers who are willing to pay in advance or subscribers who sign up at the last minute but are willing to pay a premium for the service.

In any event, the policy server determines whether the required resources for the requested session are available for all times during the entire period of the session. The policy server grants the reservation request only if sufficient resources are available for the entire period of the session.

Priority Queues:

In an enhancement that enables the cable operator to more easily provide assurances that the higher priority subscribers will get access before lower priority subscribers, the policy server implements a set of queues 50 in local data storage 52, each queue corresponding to a different priority level. When the policy server grants a reservation request, the policy server puts the reservation onto the queue of the corresponding priority level. All reservations of a given priority, regardless of when they will be activated, go into a single queue corresponding to that priority level.

At periodic times, e.g. every 15 minutes, the policy server polls its queues in order of priority with the highest priority queue being polled first to determine whether the queue has any reservations that are scheduled to start at the current time. For each reservation that is scheduled to start at that time, the policy server instructs the corresponding CMTS to set up a session with the appropriate quality of service between the application server of the content provider and the cable modem of the subscriber. Thus, according to this approach, the policy server automatically starts the session at the appropriate time (as compared to the interrupt approach described earlier according to which the application server submits its token to start the session).

At each polling interval the policy server moves through its queues in order of priority and sets up all sessions that are scheduled to start then. If it happens that capacity is lower than previously assumed and is not sufficient to support all reservations, then this approach assures that the higher priority reservations will be honored before lower priority reservations and that if service is denied to anybody it will be denied to lower priority reservations before higher priority reservations.

Of course, there are other approaches to pulling reservations off of the queues. The queues are serviced according to their priority. They can also be serviced in a weighted round robin manner. The prioritized servicing of the queues enables the Priority based future resource reservation system to give more opportunities for higher priority reservations to gain access to resources—i.e., reserve the resources. If resources are scarce, this ensures more reservations for the high priority requests, and less resources for the lower priority requests. Also, the queues are serviced in a manner where only those requests whose times are 'now' are allowed to reserve resources. A queue servicing engine 55, which is a software module within policy server 18, is responsible for keeping track of time and moves the queues forward in 'time', and thus keeps track of where 'current time' is on each one of the queues. The servicing engine processes the reservations associated with the 'current time' on the queues, based on their respective priorities.

Predictive Analysis:

Another capability that is implemented in the policy server is the capability to predict future demand for resources based upon past experience and then factor that information into the decision as to whether resources are available to reserve future resources for a particular requestor. For example, past experience might have indicated that large numbers of viewers are willing to pay a premium for the ability to receive particular content at the time when that content becomes available in the future. In other words, that experience might enable to predict a future demand. Based on that prediction, the cable operator might wish to set aside resources for those latecomers. In that case, the amount of resources made available to honor requests for future reservations of network bandwidth for other content would be reduced accordingly. Such use of this prediction capability enables the cable operator to improve the revenues generated by its available network resources by enabling them to more effectively allocate those network resources among subscribers willing to pay premium rates while reducing the risk that they will be left with large amounts of unused network resources.

In a modification of this approach, the policy server also uses prediction to control present admissions. It operates as follows. If a current request received from an application server to start a session, the policy server might determine that resources are not currently available. One approach might be to then simply reject the request and force the subscriber to wait until a later time and initiate another request. But that might result in a lost opportunity and thus lost revenue, especially if moments later the state of the network changes so that the request could be honored. The alternative approach used by the policy server in the described embodiment is to predict what resource availability will be in a short while, e.g. a few minutes or slightly longer, and then make the admission decision based on that prediction. So, for example, if it is known that certain resources are being used by a movie that is being streamed to another subscriber and that the movie is about to end, then it could be predicted that the resources needed to satisfy the current request will be available for the current request. If the prediction is that resources will soon become available, the policy simply delays its response until those resources are available and then admits the request at the slightly later time. To let the subscriber know that the request is processed and the system has not simply stalled or locked up, the policy server sends a message back to the requestor indicating that the request is being processed. The application server can then forward that response back to the subscriber.

An alternative approach to simply delaying the response and making the connection when resources are available a short time later, the policy server could notify the subscriber via the application server that the request will be honored in "x" minutes, x being whatever delay is predicted by the policy server.

Such strategies will tend to be more successful to for subscribers seeking to view a movie or participate in an interactive game, as compared to subscribers who are trying to set up a telephone call.

Such approaches enable the grantor of the request to build some elasticity in how resources are managed. The grantor of the request can 'borrow' resources against future resources which will be freeing up based on predictive modeling. And if those future predictions prove to be slightly wrong (e.g. the delay is greater than expected), the policy server could nonetheless instruct the CMTS to set up the session and temporarily draw resources from a reserve that is there for best efforts sessions. Indeed, the policy server could implement that approach immediately, based on the prediction that those reserves will be replenished in a short while by the freeing up of other resources.

Other Embodiments

Though the described embodiment involved a cable access network, the ideas presented are applicable to any session oriented access network over which content might be transmitted to subscribers.

In addition, though PCMM was the protocol that was used in the described embodiment to communicate with the policy server, another protocol from a range of alternative protocols could be used instead. For example, the application server can talk to the policy server using anyone of the following interfaces: DQoS; RSVP; SOAP/XML; and HTTP.

From the above description it should be clear that the policy server is capable of making policy and priority decisions based on many criteria different including, for example: the identity of the application or application provider; the identity of the subscriber or the subscriber tier; the current state of network utilization or the future expected and/or predicted state of network utilization; and time of day; or some combination of those, just to name a few examples.

In general, including the identity of the application or application provider as a criterion allows, among other things, operators to implement and maintain control over 3rd party relationships. It also allows operators to better control their own services. An example of an application-based policy would be: "Do not allow more than 100 sessions of video streaming over the HFC network."

Including subscriber and/or subscriber tier allows operators to control the access to services based on individual subscribers or their tier. So, for example, certain services may be available only to 'Gold' tier subscribers. An example of such policy would be: "Allow this video session if the subscriber is a 'Gold' subscriber."

Using network resource utilization as a criterion allows operators to control new service sessions based on the current state of utilization of the network due to sessions that have already been admitted. Network utilization-based policies could be based on CMTS-usage, CMTS-port-usage, CMTS-DOCSIS-channel-usage, CMTS-DOCSIS-Scheduling- Type-usage, etc. An example of such a policy would be: "Allow this video session if the network utilization of the channel is less than 80%."

An example of combining various of the above-mentioned criteria is the following:
If application is video streaming
and if subscriber belongs to Gold Tier
and if Network Resource Utilization of the channel is less than 80%
and if it is a weekday
Allow this session
Other embodiments are within the following claims.

What is claimed is:

1. A method implemented by a policy server for managing a network, said method comprising:
receiving a request at the policy server to establish a session at a future time T1 over the network, said requested session for transferring content between a content server and a subscriber's equipment and involving a network termination device through which the requested session will pass;
in response to receiving said request, determining whether sufficient network bandwidth will be available at said network termination device at time T1 to support the requested session, wherein determining whether sufficient network bandwidth will be available at time T1 comprises predicting future demand for network bandwidth associated with future sessions at said network termination device at time T1 and then taking into account future reservations for network bandwidth at said network termination device at time T1 as well as the predicted demand for network bandwidth;
if sufficient network bandwidth is determined to be available at the network termination device at time T1, at the policy server reserving network bandwidth of the network termination device necessary to support the requested future session;
acknowledging to the requestor that network bandwidth has been reserved for said requestor for time T1; and
when current time reaches time T1, causing the requested session to be set up through the network termination device for transferring content between the content server and the subscriber's equipment.

2. The method of claim 1, further comprising keeping track of reserved network bandwidth that is being set aside for other future sessions and wherein determining whether sufficient network bandwidth will be available at time T1 also involves taking into account reserved network bandwidth at time T1.

3. The method of claim 1, further comprising:
maintaining a plurality of queues each of which corresponds to a different priority level; and
determining a priority level for the session that was requested, said priority level for the session being the same as the priority level for one of said plurality of queues, wherein reserving said network bandwidth involves storing a reservation in a queue corresponding to the priority level of the requested session.

4. The method of claim 3, further comprising polling the plurality of queues in order of their priority levels to identify any stored requests having a reservation time that equals current time and for any stored requests having a reservation time that equals current time, setting up a corresponding requested session on the network for delivering content.

5. The method of claim 1, wherein the network over which the content is delivered includes at least a portion that is a cable network.

6. The method of claim 1, wherein receiving a request to establish a session at a future time T1 over the network involves receiving said request via the Packet Cable Modem Multimedia protocol.

7. The method of claim 1, wherein the content server is a multimedia server.

8. The method of claim 1, wherein predicting future demand for network bandwidth at time T1 is based on past experience.

9. The method of claim 1, wherein predicting future demand for network bandwidth at time T1 involves predicting how much network bandwidth will be requested for time T1 and for which no reservations have been made.

10. The method of claim 1, wherein the termination devices are Cable Modem Termination systems.

11. The method of claim 1, wherein the predicted future sessions at said network termination device at time T1 are not currently reserved sessions at said network termination device at time T1.

12. A policy server for managing delivery of content over a network, said policy server comprising:
a processor; and
memory storing program code which when executed on the processor causes the policy server to perform the functions of:
receiving a request to establish a session at a future time T1 over the network, said requested session for transferring content between a content server and a subscriber's equipment;
in response to receiving said request, determining whether sufficient network bandwidth will be available at time T1 to support the requested session, wherein determining whether sufficient network bandwidth will be available at time T1 comprises predicting future demand for network bandwidth associated with future sessions at time T1 at a network termination device through which the requested session will pass and then taking into account future reservations for network bandwidth at said network termination device at time T1 as well as the predicted future demand for network bandwidth;
if sufficient network bandwidth is determined to be available at time T1, reserving network bandwidth of the network termination device necessary to support the requested future session;
acknowledging to the requestor that network bandwidth has been reserved for said requestor for time T1; and
when current time reaches time T1, causing the requested session to be set up through the network termination device for transferring content between the content server and the subscriber's equipment.

13. The policy server of claim 12, wherein predicting future demand for network bandwidth at time T1 is based on past experience.

14. The policy server of claim 12, wherein predicting future demand for network bandwidth at time T1 involves predicting how many network resources will be requested for time T1 and for which no reservations have been made.

15. The policy server of claim 12, wherein the termination devices are Cable Modem Termination systems.

16. The policy server of claim 12, wherein the predicted future sessions at said network termination device at time T1 are not currently reserved sessions at said network termination device at time T1.

* * * * *